Figures 1, 2, 3, 4, 5:
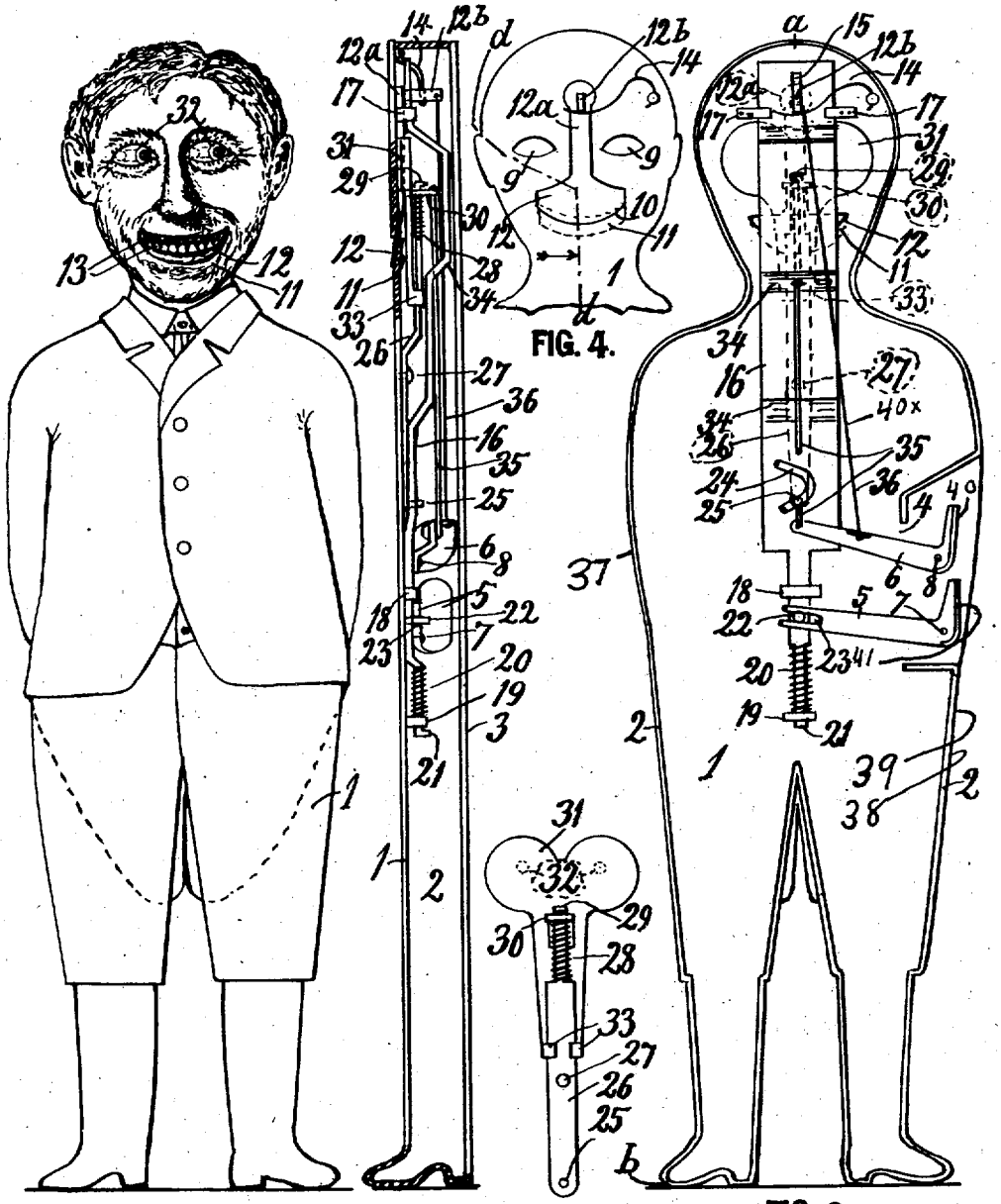

Reissued Sept. 2, 1913.

A. E. HOLMBERG.

TOY.

13,611.

APPLICATION FILED JULY 5, 1913.

WITNESSES:

A. S. Carlsen.

M. M. Carlsen.

INVENTOR:

Alfred E. Holmberg.

BY his ATTORNEY:

A. M. Carlsen.

UNITED STATES PATENT OFFICE.

ALFRED E. HOLMBERG, OF MAPLE LAKE, MINNESOTA.

TOY.

13,611. Specification of Reissued Letters Patent. Reissued Sept. 2, 1913.

Original No. 1,053,994, dated February 25, 1913, Serial No. 667,267. Application for reissue filed July 5, 1913. Serial No. 777,555.

*To all whom it may concern:*

Be it known that I, ALFRED E. HOLMBERG, a citizen of the United States, residing at Maple Lake, in the county of Wright and State of Minnesota, have invented a new and useful Toy, of which the following is a specification.

My invention relates to toys, and the object is to provide a doll or image of a human being, which by an easily operated mechanism may have its mouth and eyes moved in comic manners adapted to amuse children.

In the accompanying drawing,—Figure 1 is a front elevation of a doll embodying my invention. Fig. 2 is a view of the back of the doll shown in Fig. 1 with the rear side removed so as to expose the mechanism, with the spring 28 in Figs. 3 and 5 omitted. Fig. 3 is a side elevation of the doll with the side of the body removed as between the points *a* and *b* in Fig. 2 and the front plate of the body in section on the line *d*—*d* in Fig. 4, Fig. 4 is a detail view of the head portion of the front body plate in Fig. 2 with nearly all mechanism omitted. Fig. 5 is a detail view of the vibrator lever and the eye-carrying plate slidably mounted thereon.

Referring to the drawing by reference numerals, the body of the doll may be made more or less in the likeness of a human being, from a mere plate 1 made in outline to resemble a face view of a person and having all fixed parts painted or printed upon its front, and the mechanism mounted upon the back, to the most complete form of a doll body. In the drawing I have shown said painted front plate 1 provided with an angular rim 2 to which may be secured a rear plate 3 (shown in Fig. 3 but removed in Fig. 2). When the rim 2 is present it is provided with an opening 4 through which operate two L-shaped finger levers 5 and 6, which are pivoted to the body plate 1 at 7 and 8 respectively, and operate the mechanisms mounted on said plate and which are as follows: The body plate 1 is provided with two eye openings 9 and a slit 10, the latter representing the mouth of the doll. Said mouth has its lower edge 11 offset inward (as best shown in Fig. 3) to permit a tongue 12 to slide downward and partly out of the mouth; upon said tongue are printed teeth 13, and below said teeth the end of the tongue is printed or painted red so that whenever the tongue is protruded downward the teeth will become exposed and the red end of the tongue representing the lower lip, moves downward, so that it appears as if the doll was opening the mouth and thereby exposing the teeth, as in laughing or chewing or talking. The tongue 12 has an upward arm $12^a$ extending between the eye openings 9 and provided with a rearward lug $12^b$, which is engaged by a spring 14 that holds the tongue normally in raised or retracted position. Such upward tendency of the tongue is regulated by the upper terminal of a slot 15 (see Fig. 2) in the upper end of a flat bar 16, whose upper end is guided in keepers 17 and the lower end in bearings 18 and 19; upon the latter bearing stands an expanding coil spring 20, which holds the bar 16 normally in raised position with its bottom hook 21 stopping against the bearing 19. The lower portion of the bar 16 is provided with a stud 22 occupying a slot 23 in the lever 5. The bar 16 is also provided with a curved slot 24 engaging a stud 25 which, as best shown in Fig. 5, is fixed in the lower end of the lever 26, and the latter is pivoted at 27 to the front body plate and has its upper end reduced and encircled by a coil spring 28, by which spring is held upwardly against a lug 29 the perforated lug 30 of a plate 31, upon whose front side the eyes 32 of the doll are painted or printed. The plate 31 is further guided by having hooks 33 slidable on the edges of the vibrator lever 26. Through a hole in a rearward offset 34 of the bar 16 extends a rod 35, which connects the lug 30 with the finger lever 6. Said lever is also connected by a string, chain, or a light flexible wire, 36, with the lug $12^b$ of the tongue arm $12^a$; said string 36 may extend through holes in the offset 34, as in Fig. 3, or rearward of the offset, as in Fig. 2.

In the operation of the toy the doll is grasped about as shown in Fig. 2, between the thumb placed at 37 and the little-finger placed at 38 and ring-finger at 39 and with the fore-finger at 40 and long-finger at 41 on the levers 6 and 5, the operator by pressing on lever 5 causes the bar 16 to descend and by its curved slot 24 act on the stud 25 and thus make the eye plate 31 swing from side to side, and by releasing the pressure the spring 20 will cause the bar 16 to ascend and impart a similar movement to the eye plate, thus causing the eyes to appear winking from side to side in the eye sockets or openings. During such movement of the eyes the tongue will be protruded and retracted by each motion of the bar 16, since the upper terminal of the slot 15 moves the tongue downward and the spring 14 returns it upward; and in cases where I may omit the spring 14 the lower terminal of the slot 15 will raise the tongue. If the operator desires to have the eyes close or blink in a downward direction instead of horizontally, he presses on the lever 6 and thereby causes the rod 35 to move the eye plate downward and the spring 28 moves it upward, while the string 36 moves the tongue downward and the spring 14 returns it upward. If it is desired to let the eyes stand still and only move the mouth or tongue, to represent chewing, talking or smiling, the operator simply puts his forefinger at $40^x$ and presses at the side of the string 36, the deflection of which will pull downward at the lug $12^b$, and as often as the pressure is released the spring 14 will return the lug and tongue upward. By alternating and partly combining the three operations just described, it is obvious that the eyes will get a combined horizontal and vertical movement, which in conjunction with more or less motion of the mouth is very amusing to children.

What I claim is:

1. In a doll, the combination with a body having its face provided with eye-openings, of a vibrator lever pivoted to the body and having at its upper end a plate with eyes printed or painted thereon, a finger lever pivoted to the body, and operative connection between the finger lever and the vibrator lever; said operative connection involving an actuator bar mounted to slide up and down on the body and having connection with the finger lever whereby the latter moves it in one direction, a spring arranged to move the bar in the opposite direction; said sliding bar having a curved slot, and the vibrator lever having a stud or pin projecting into said curved slot.

2. In a toy doll, the combination with a body having its face provided with eye-openings and a slit-shaped mouth-opening with the lower edge thereof struck partly inward beyond the upper edge, of a plate slidable in said slit and having upon its outer side printed or painted teeth and the lower lip of the mouth, a vertically slidable bar on the body and having operative connection with said tongue plate, a finger lever pivoted on the body and operatively connected with the sliding bar to move it in one direction, and a spring arranged to move it in the other direction; a vibrator lever mounted on the body and having at its upper end a plate with eyes thereon arranged to move from side to side near the eye-openings, said vibrator lever having operative connection with the slidable bar.

3. In a toy doll, the combination with a body having its face provided with eye-openings and a mouth opening, of a tongue-shaped plate slidable up and down in the mouth-opening and having teeth and the lower lip of the mouth represented upon it, the inner portion of the tongue being a narrow upward arm between the eye-openings and provided with a rearward lug, a vertically slidable bar mounted on the body and having a slot in which the lug is vertically slidable but also operable by the terminals of the slot, a spring engaging the lug to hold the tongue normally upward almost retracted into the mouth, a finger lever pivoted on the body, and a flexible element connecting it with the lug to pull the latter downward, a vibrator lever pivoted to the body and having operative connection with the slidable bar, a spring acting on the slidable bar to raise it and a finger lever adapted to lower it, a spring-supported plate slidable on the vibrator lever and having eyes represented upon it adjacent the eye-openings, and a rod connecting said slidable eye plate with the first mentioned finger lever.

In testimony whereof I affix my signature, in presence of two witnesses.

ALFRED E. HOLMBERG.

Witnesses:
W. E. Feeney,
Thos. Madigan.